United States Patent [19]

Iggulden et al.

[11] Patent Number: 5,333,091
[45] Date of Patent: Jul. 26, 1994

[54] METHOD AND APPARATUS FOR CONTROLLING A VIDEOTAPE PLAYER TO AUTOMATICALLY SCAN PAST RECORDED COMMERCIAL MESSAGES

[75] Inventors: Jerry Iggulden, Santa Clarita; Alan McFarland, North Hollywood, both of Calif.

[73] Assignee: Arthur D. Little Enterprises, Inc., Cambridge, Mass.

[21] Appl. No.: 2,782

[22] Filed: Jan. 8, 1993

[51] Int. Cl.⁵ .................. G11B 27/02; H04N 9/79
[52] U.S. Cl. .................. 360/14.1; 360/14.3; 358/311; 358/313; 358/908
[58] Field of Search .............. 360/14.1–14.3, 360/33.1, 69, 71, 74.5; 358/908, 311–313, 335

[56] References Cited

U.S. PATENT DOCUMENTS

| | | | |
|---|---|---|---|
| 2,424,216 | 7/1947 | Atkins | 179/1 |
| 2,630,525 | 3/1953 | Tomberlin et al. | 250/6 |
| 2,761,697 | 9/1956 | Jones | 179/1 |
| 3,011,030 | 11/1961 | Langendorf | 179/100.1 |
| 3,424,865 | 1/1969 | Marchand | 178/5.8 |
| 3,628,153 | 12/1971 | Fukata | 325/395 |
| 3,681,523 | 8/1972 | Sidline | 178/6.6 A |
| 3,725,604 | 4/1973 | Alexander | 179/100.1 |
| 3,730,986 | 5/1973 | Morchand | 178/5.6 |
| 3,745,240 | 7/1973 | Morchand et al. | 178/5.6 |
| 4,229,765 | 10/1980 | Sanger | 358/188 |
| 4,259,689 | 3/1981 | Bonner | 358/165 |
| 4,314,285 | 2/1982 | Bonner et al. | 360/33 |
| 4,319,286 | 3/1982 | Hanpachern | 360/33 |
| 4,325,088 | 4/1982 | Wright | 360/14 |
| 4,343,024 | 8/1982 | Kawai | 360/74.5 X |
| 4,390,904 | 6/1983 | Johnston et al. | 358/335 |
| 4,430,676 | 2/1984 | Johnson | 360/13 |
| 4,492,993 | 1/1985 | Otis | 360/74.5 |
| 4,520,404 | 5/1985 | Von Kohorn | 358/335 |
| 4,587,572 | 4/1983 | DiGiulio | 360/14.3 |
| 4,602,297 | 7/1986 | Reese | 360/14.1 |
| 4,605,973 | 8/1986 | Von Kohorn | 358/335 |
| 4,618,895 | 10/1986 | Wright | 358/311 |
| 4,750,052 | 6/1988 | Poppy et al. | 358/335 |
| 4,750,053 | 6/1988 | Allen | 358/335 |
| 4,750,213 | 6/1988 | Novak | 455/107 |
| 4,752,834 | 6/1988 | Koombes | 358/908 X |
| 4,782,401 | 11/1988 | Faerber et al. | 358/335 |
| 4,879,611 | 11/1989 | Fukui et al. | 360/69 |
| 4,918,531 | 4/1990 | Johnson | 358/183 |
| 4,979,047 | 12/1990 | Wine | 358/335 |
| 5,019,899 | 5/1991 | Boles et al. | 358/84 |
| 5,057,932 | 10/1991 | Lang | 358/335 |
| 5,075,546 | 12/1991 | Kamada et al. | 250/231.1 |
| 5,151,788 | 9/1992 | Blum | 358/188 |

FOREIGN PATENT DOCUMENTS

| | | | |
|---|---|---|---|
| 0158293 | 10/1985 | European Pat. Off. | |
| 0161512 | 11/1985 | European Pat. Off. | |
| 0146072 | 8/1983 | Japan | 360/141 |
| 03292655 | 12/1991 | Japan | |
| WO81/00945 | 4/1981 | PCT Int'l Appl. | |

*Primary Examiner*—Aristotelis Psitos
*Assistant Examiner*—Jennifer G. Pearson
*Attorney, Agent, or Firm*—Blakely, Sokoloff, Taylor & Zafman

[57] ABSTRACT

An automatic editing device is coupled between a conventional VCR and a conventional television monitor/receiver. During recording of a television signal, data is accumulated with respect to the time of occurrence and duration of detectable events, such as blank frames, in the television signal, and such data is stored in the device. At a time subsequent to the recording process, the stored data is analyzed to classify the content of the television signal between the detectable events. The recording is made on a tape which has timing reference data permanently encoded thereon. During playback, the stored data for each event is compared to the timing reference data read from the tape and the VCR is automatically commanded into a fast scan mode when the tape reaches the beginning time of a portion of the video signal that has been classified for elimination during playback. The VCR is then automatically commanded to return to the normal "play" mode when the tape reaches the ending time of that portion of the video signal. Since all of the television signal is recorded on the tape, any or all of the signal may be viewed, even if portions of it have been misclassified.

9 Claims, 11 Drawing Sheets

METHOD AND APPARATUS FOR CONTROLLING A VIDEOTAPE PLAYER TO AUTOMATICALLY SCAN PAST RECORDED COMMERCIAL MESSAGES

BACKGROUND OF THE INVENTION

1. Field of the Invention

This invention relates to the field of video recording and playback systems, and particularly to a method and apparatus for selectively omitting certain program content during playback of a recorded video signal.

2. Background Art

It is commonplace to record a commercial television program on a video tape recorder (VTR, also referred to as a video cassette recorder or VCR) for viewing at a later time. When later viewing the recorded program, many, if not most, viewers prefer to watch only the program material without also viewing commercials, promotional messages and the like that are typically broadcast at intervals during the program.

Numerous methods and devices have been proposed for automatically eliminating commercials and the like from a recorded program. For example, PCT Application No. WO081/00945 by Johnston and Koombes discloses a system for automatically detecting and editing commercial messages from a television broadcast signal. Their system detects the "breaks" in the television signal that characteristically occur prior to and at the end of a commercial message. Each such break triggers a timing circuit that has a timing interval slightly greater than the maximum expected duration of a commercial message. The timing circuit causes an associated VTR to switch from the "record" mode to the "pause" mode so that commercial messages will not be recorded. When the timing circuit times out without having been retriggered by further breaks. recording is resumed. Such a system is claimed to be relatively effective for eliminating commercial messages, but suffers certain drawbacks. In this regard, program material immediately following a commercial break is irretrievably lost since the VTR is held in the "pause" mode for a predetermined period of time (30 to 60 seconds or more) following each break in the television signal. Furthermore, additional program material may be irretrievably lost if the timing circuit is falsely triggered, such as by a fade between scenes in the program.

Other prior art systems have sought to overcome these drawbacks. For example, U.S. Pat. No. 5,151,788 to Blum discloses a system for eliminating commercials from a video signal that performs real time analysis of the video signal immediately following a blank frame. If there is a high level of "activity" in the signal immediately following a blank frame, a commercial message is presumed and the VCR is commanded to pause. On the other hand, if a low level of activity is detected, the preceding blank frame is presumed to be a fade and the VCR is commanded to resume recording. This approach solves the problem of losing a fixed amount of program material if a VCR pause if falsely triggered, but it is still susceptible to misclassification. If a program fade is immediately followed by an "active" scene, this will be misclassified as a commercial. On the other hand, a commercial with a low level of "activity" will be misclassified as program material.

Still other prior art systems detect the presence of a commercial after it has been aired and then rewind the VCR to continue recording at the beginning of the detected commercial. One such "reciprocating" system is disclosed in U.S. Pat. No. 4,750,052 issued to Poppy and Samelson. In this system, a pair of successive fades in the television signal separated by a time interval characteristic of a commercial will cause the VCR to be commanded to rewind to the point where the first fade was recorded. The VCR then continues recording, and the process will repeat if multiple commercials are broadcast back-to-back. This system permits an editing decision to be made after an entire commercial has been aired; however, as with the other systems previously described, program material is still irretrievably lost if there is a false detection of a commercial. Furthermore, the frequent rewinding of the tape during long commercial breaks accelerates the wear of the VCR tape transport mechanism as well as the tape itself.

All of the above described systems, and all other known prior art systems for selectively removing commercials from a taped television program attempt to remove the commercials during the recording process. Consequently, an error in the logic that identifies a portion of the television signal as a commercial will cause program material to be irretrievably lost. Furthermore, most such systems, even when false triggering does not occur, will lose some initial portion of a program immediately following a commercial break.

SUMMARY OF THE INVENTION

One of the objects of the present invention is to provide a method and apparatus for automatically editing a recorded television signal during playback.

Another object of the present invention is to provide a method and apparatus for determining the presence of a commercial in a recorded television signal by performing analysis of the signal at a time subsequent to the recording process.

A further object of the present invention is to provide a method and apparatus by which a television signal may be recorded in its entirety and later replayed such that certain portions of the television signal are automatically scanned past at high speed.

These and other objects of the present invention are achieved in a device that is coupled between a conventional VCR and a conventional television monitor/receiver. During recording of a television signal, data is accumulated with respect to the time of occurrence and duration of detectable events, such as blank frames, in the television signal, and such data is stored in the device. At a time subsequent to the recording process, the stored data is analyzed to classify the content of the television signal between the detectable events. The recording is made on a tape which has timing reference data permanently encoded thereon. During playback, the stored data for each event is compared to the timing reference data read from the tape and the VCR is automatically commanded into a fast scan mode when the tape reaches the beginning time of a portion of the video signal that has been classified for elimination during playback. The VCR is then automatically commanded to return to the normal "play" mode when the tape reaches the ending time of that portion of the video signal. Since all of the television signal is recorded on the tape, any or all of the signal may be viewed, even if portions of it have been misclassified.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices and circuits are omitted so as to not obscure the description of the present invention with unnecessary detail.

System Overview

Figure 1:
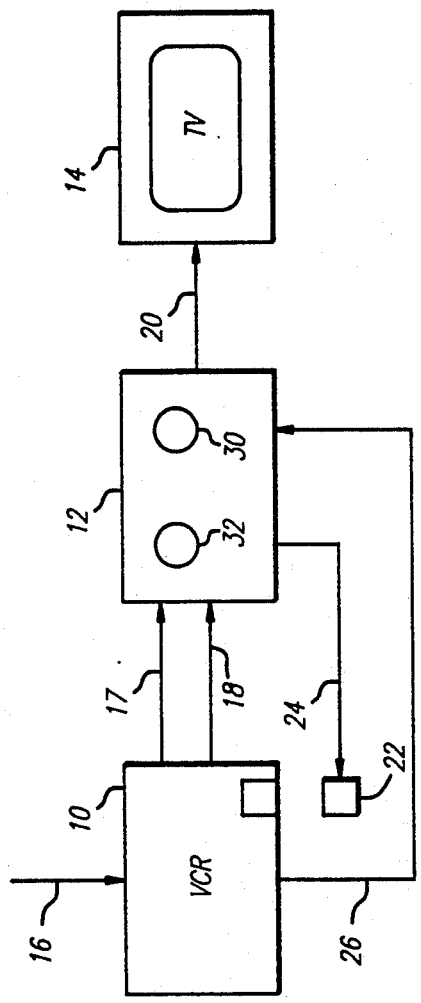
FIG. 1 is a block diagram of an automated video editing system according to the present invention.

Referring first to FIG. 1, a system embodying the present invention is illustrated. The system employs a conventional video cassette recorder (VCR) 10; however, the invention is not limited in this regard and may be employed with other types of recording equipment, including, for example, reel-to-reel magnetic tape recorders and writeable optical disc recorders. A control unit 12 is coupled between VCR 10 and a conventional television receiver/monitor 14. A video input signal is supplied to VCR 10 on line 16 in a conventional manner. Line 16 may be connected to any appropriate source of video signals, such as an antenna, cable jack, cable converter box or a video switching unit. The audio outputs 17, video output 18 and radio frequency (RF) output 26 of VCR 10 are supplied to control unit 12.

The control unit is coupled to television 14 by cable 20, which may be an audio/video interface if television 14 is equipped with such inputs or an RF interface for reception on television channel 3 or 4. Control unit 12 is equipped with both audio/video and RF output jacks to accommodate either type of television input.

Control unit 12 includes a transmitter 22 for communicating with the remote control input of VCR 10. Since VCRs are now almost universally equipped with infrared (IR) remote control devices, transmitter 22 is preferably an IR emitter. Since an IR emitter must be placed within a line of sight of the VCR's IR receiver, emitter 22 is preferably coupled to control unit 12 by a cable 24 so that it may be placed in a convenient location for transmitting control signals to VCR 10. The front panel of control unit 12 includes "ready" button 30 and "ready" light 32, the functions of which will be described below.

As a program is recorded by the VCR, the pattern, duration and interval of blank frames or other detectable events in the video signal are detected by control unit 12 and information with respect thereto is stored for later analysis. Based on an analysis of the stored data, the video signal between the detectable events is classified according to whether or not it is to be viewed upon playback of the video tape. In particular, the pattern, duration and interval of blank frames are analyzed to determine when commercial messages are present in the video signal so that those portions of the video signal can be rapidly scanned past during playback. A time-based map of the video signal is created and stored in control unit 12 for controlling advancement of the video tape during playback by means of IR emitter 22.

Figure 3:
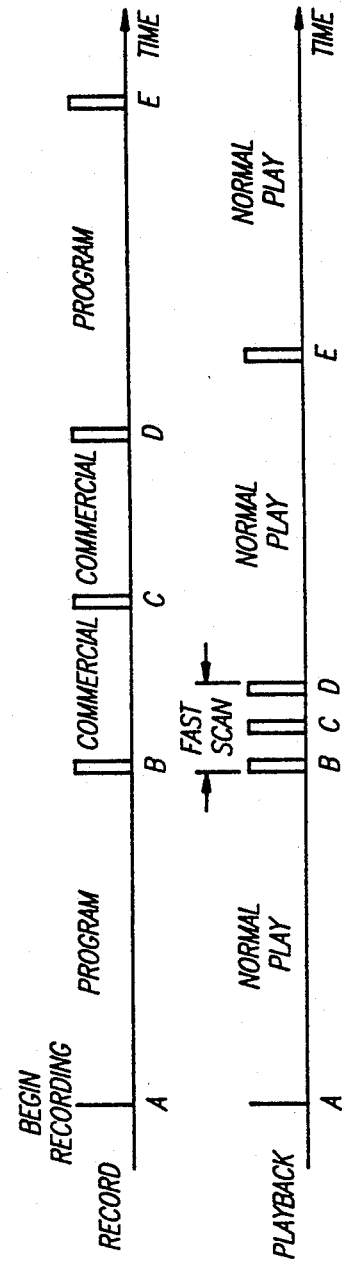
FIG. 3 illustrates the record and playback functions of the present invention.

This process may be better understood with reference to FIG. 3. Referring to the upper portion of the diagram, recording of a television signal commences at event A. One or more blank frames are encountered at events B, C, D and E. When the recording is completed, the time of occurrence and duration of each group of blank frames is analyzed as will be subsequently described and the television signal between each pair of events is classified as either program material or commercial material. In the example portrayed in FIG. 3, it is determined that commercial messages have been broadcast between events B and C and also between events C and D. The signal immediately following the beginning of recording (i.e., between events A and B) is presumed to be program material.

Upon playback of the video tape, the tape is rewound to the starting point (event A). The VCR commences playing the program in normal fashion until the tape reaches the position corresponding to event B. Since the television signal between events B and C has been classified as commercial material, the VCR is commanded into the fast scan mode. When the tape reaches the position corresponding to event C, the VCR remains in the fast scan mode since the television signal between events C and D has also been classified as commercial material. When the tape has advanced to the position corresponding to event D, the VCR is commanded back into the play mode for normal viewing of the program material between events D and E.

Although the embodiments described herein are intended for used with a conventional "single deck" VCR, the present invention may also be advantageously employed with a "dual deck" VCR. In this case, recording of a program would proceed on a first deck of the VCR as just described. The analysis of the television signal may then be used to copy the program recorded on the first deck onto the second deck, but without the commercial interruptions. In this regard, the first deck may be commanded to alternate between the normal play and fast scan modes as described above while the second deck is recording. Alternatively, the second deck may be commanded to pause during the playback on the first deck of those portions of the television signal that have been classified as commercial material. In either case, the signal recorded on the second deck will contain only those portions of the signal that have been classified as program material.

The present invention is preferably constructed as a self-contained unit as illustrated in FIG. 1; however, the invention may be advantageously combined with either a VCR or a television receiver. In the former case, certain advantages are realized. For example, the VCR mode may be directly controlled rather than via an infra-red signal. Furthermore, combining the control unit with the VCR obviates the need to provide time and tape identification codes that may be detected within the recorded video signal as described below. In a combined unit, additional sensors may be provided for retrieving the codes from the videotape and an optical encoding scheme is therefore particularly attractive. Alternatively, unmodified standard videotapes could be employed by recording a time code on the tape with a dedicated recording head at the same time the video signal is recorded. The time code could then be recovered on playback with a dedicated read head. Such time code information could be recorded, for example, in the guard band separating the audio tracks. Another approach would be to modulate or encode the time code on the audio, video or control track signal. In this regard, a vertical interval time code (VITC) encoded on the non-viewed portion of a recorded video signal may be employed. All such alternative embodiments of the system and method disclosed herein are within the scope of this invention.

The system of the present invention preferably employs a specially prepared video cassette that provides timing information to control unit 12. In a preferred embodiment, such a video cassette contains video tape that has been treated as more fully described below to selectively remove the oxide along a longitudinal stripe near one edge of the tape. The oxide is removed at periodic intervals along the tape in a pattern that encodes a unique identification code for the cassette and a time code indicative of the position of the tape from the beginning thereof.

The present invention is not limited to use with a video tape as described herein. All that is required is that control unit 12 receive an input indicative of the instantaneous position of the tape in VCR 10 in terms of elapsed time since a recorded program began. Thus, for example, the video cassette may be provided with a micro-transmitter capable of communicating to a corresponding receiver in control unit 12. During playback of a tape (and, for that matter, during the recording process as well), the transmitter would continuously send encoded data to the control unit indicating the position of the tape in the cassette. Such data may be obtained by various means, such as by an optical code applied to the back side of the tape, by an encoded spool in the cassette or by a revolution counter driven by one of the cassette spools.

It is possible to practice the present invention even without a direct indication of the tape position. In this regard, the fast scan speed of the VCR may be calibrated during an initial set up procedure. If the fast scan speed of the VCR is known with sufficient accuracy, the instantaneous position of the tape may be computed within control unit 12 as a function of time from the beginning of the recorded program. This requires that playback always start at the beginning of the recorded program or that some other means be provided for informing the system where playback is begun. It is also necessary to inform the system of the tape identification so that the appropriate stored data is utilized. Although this approach does not have the timing accuracy afforded by a specially prepared video cassette, it should provide adequate results, particularly if the tape position during playback is periodically recalibrated against the data stored during the recording process by means of a pattern matching algorithm.

Hardware Description

Figure 2:
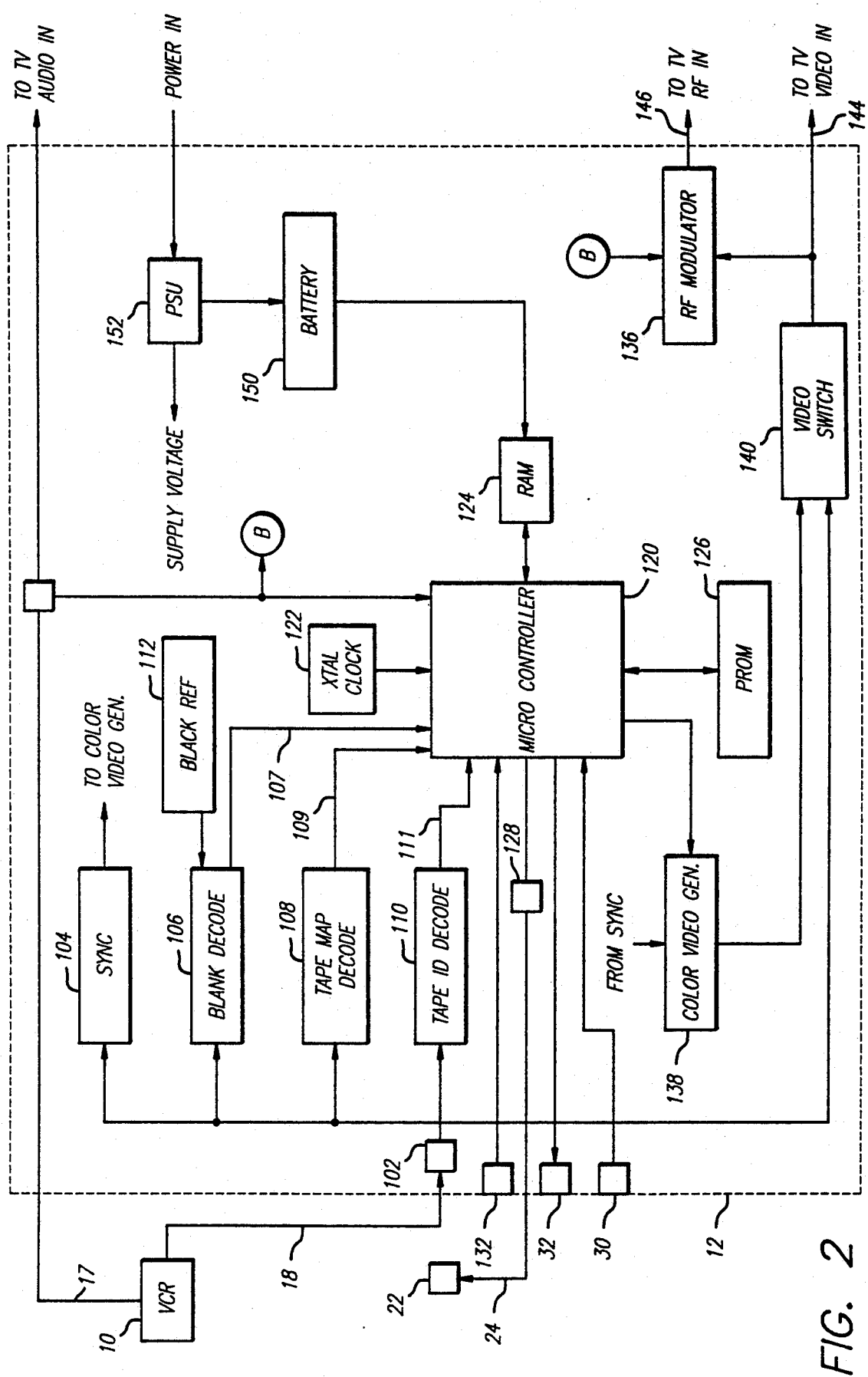
FIG. 2 is a functional block diagram of the control unit of the system shown in FIG. 1.

With reference now to FIG. 2, the construction of control unit 12 will be described at a functional level. The video output signal of the VCR is received by control unit 12 on line 18 as mentioned above. The video signal is received and buffered by video amplifier 102 where the video signal is black level clamped and amplified. The amplified video signal is asserted at sync detector 104 which detects the horizontal and vertical synchronization pulses within the video signal and provides logic level signals for use as the main sync clock for the decoders 106, 108 and 110 and for microcontroller 120. Microcontroller 120 may comprise a general purpose microprocessor and associated peripheral circuits. Preferably, however, microcontroller 120 is implemented in an application specific integrated circuit (ASIC).

Decoder 110 is active during tape initialization to detect the tape identification code. Decoder 110 receives the amplified video signal, and when a valid tape identification code is detected, the identification code is asserted at microcontroller 120 on line 111. In a similar fashion, decoder 108 detects valid timing codes in the amplified video signal. These codes are asserted at microcontroller 120 on line 109.

Decoder 106 detects the presence of a blank video frame by comparing the amplified video signal with a black reference value from circuit 112. Upon detection of a blank frame, decoder 106 provides an input signal to microcontroller 120 on line 107. Alternatively, decoder 106 may incorporate logic to count a predetermined number of consecutive blank frames before asserting the input signal to the microcontroller.

As a program is recorded, the video signal on line 18 is not generated by the playback head and therefore does not contain the time code information from the tape. In order for control unit 12 to develop a time-based map of blank frames in the video signal, microcontroller 120 uses a crystal-based real time clock 122 for time stamping the detected blank frames. Correlation with the time code data from the tape during playback is assured due to the precision of the video tape drive speed.

As recording proceeds, the time of occurrence and duration for each contiguous set of detected blank frames (an "event") is stored in RAM 124. When the recording process ends, as detected by the loss of sync pulses when the VCR shuts off, the information stored in RAM 124 is analyzed by microcontroller 120 in accordance with algorithms stored in PROM 126 to classify the video signal between pairs of events as either program material or commercial material. The analyzed data, together with classification information for the video signal, is stored back in RAM 124 in association with the tape identification code so that control signals can be generated for controlling the VCR when the tape is replayed. RAM 124 is powered by a back-up battery or supercapacitor 150 which is kept charged by power supply unit 152 so that all data stored for each of the uniquely identified video cassettes is retained in the event of a power failure.

As an alternative for storing signal analysis data in RAM 124, an alternative embodiment of the present invention may write such data onto the videotape itself. This assures the integrity of the data relative to the particular video cassette and reduces the memory requirements for control unit 12. Such an embodiment requires a further connection between control unit 12 and VCR 10 to supply a video signal for recording on the videotape in which the signal analysis data is encoded. In a variation of this embodiment, individual markers may be recorded onto the videotape at each location where the play rate of the VCR is to be changed upon playback. Such a recording process would be done "off line" after the program recording is completed and the event data has been analyzed.

The VCR control signals are generated within microcontroller 120 and asserted at amplifier 128. The output of this amplifier drives infrared transmitter 130 to send the commanded control signal to the VCR. Control unit 12 preferably includes an infrared receiver 132 having its output coupled to microcontroller 120 so that the infrared commands of the associated VCR can be "learned" from the remote control unit supplied with the VCR.

During playback of a video tape, it is preferable that the TV screen be blanked while the VCR is in the fast scan mode. To achieve this, video generator 138 provides a video signal to generate a predetermined video format such as a solid blue or other color screen. The output of video generator 138 or the amplified video signal from the VCR are selected by video switch 140 under the control of signal 142 from microcontroller 120. Signal 142 selects the VCR video signal during the normal play mode and selects the output of video generator 138 during the fast scan mode. The output of video switch 140 is coupled to video output jack 144 and also to the input of the RF modulator 136.

Operational Description

Having thus described a hardware system for implementing the present invention, the sequence of operational events will be more fully described with continuing reference to FIGS. 1-3 and particular reference to FIGS. 4-7. It will be appreciated that the events to be described are best implemented by a sequence of program steps controlling the operation of microcontroller 120. As mentioned above, this sequence of program steps is stored in PROM 126.

Figure 4:
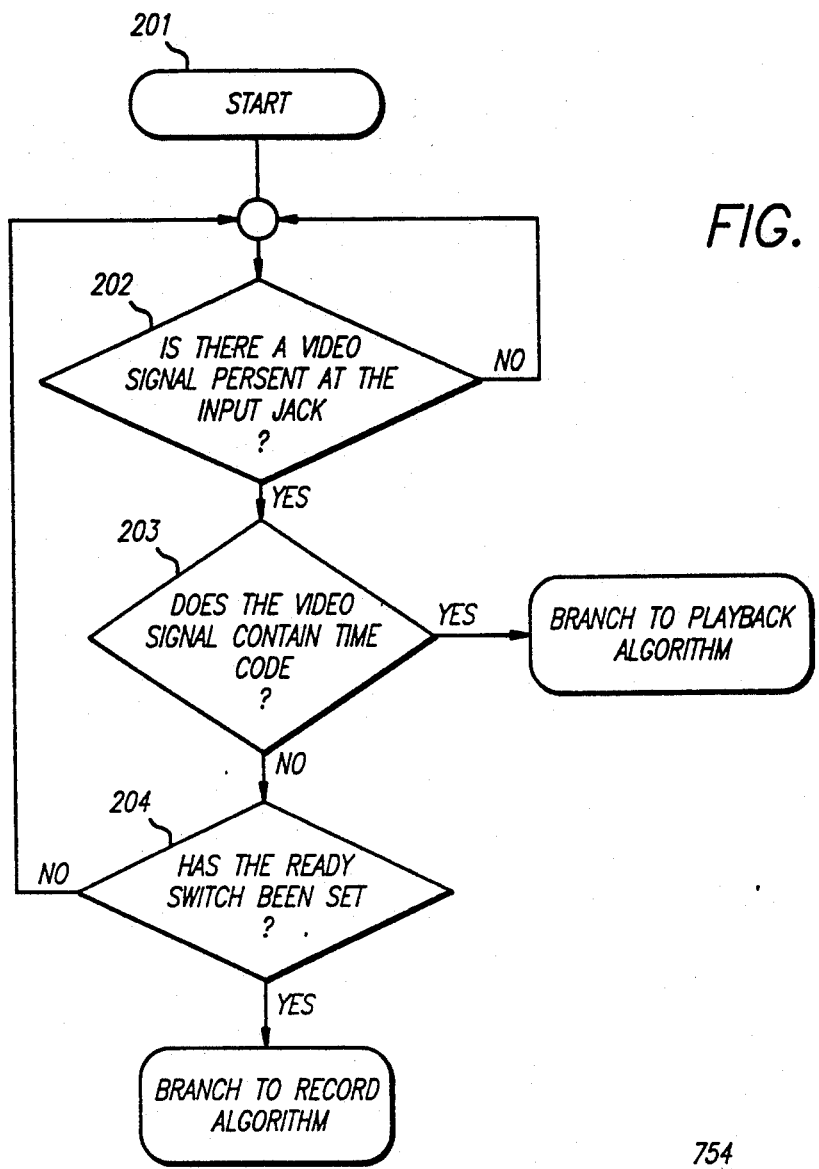
FIG. 4 is a functional flow diagra, of the operating system of the present invention.

Referring to FIG. 4, the overall operating system for control unit 12 is shown. When power is first applied to the control unit, the system is initialized at step 201. Control unit 12 is normally supplied with power at all times. Once initialized, the sync port of the microcontroller is polled to determine if a video signal is present on input line 18. The microcontroller waits in a tight loop until a video signal is received. Once the presence of a video signal is detected, the time code input from decoder 108 is polled to determine if the video signal contains time code information from a specially prepared video tape. If such time codes are present, the program branches to the playback routine which will be discussed below in connection with FIG. 7. If there is a video signal present, but it does not contain time code information, the input from the "ready" switch 34 is examined. If this switch has been set, program control branches to the record routine discussed below in connection with FIG. 6. If the switch has not been set, then no action by control unit 12 is required and the program branches back to step 202.

Figure 6:
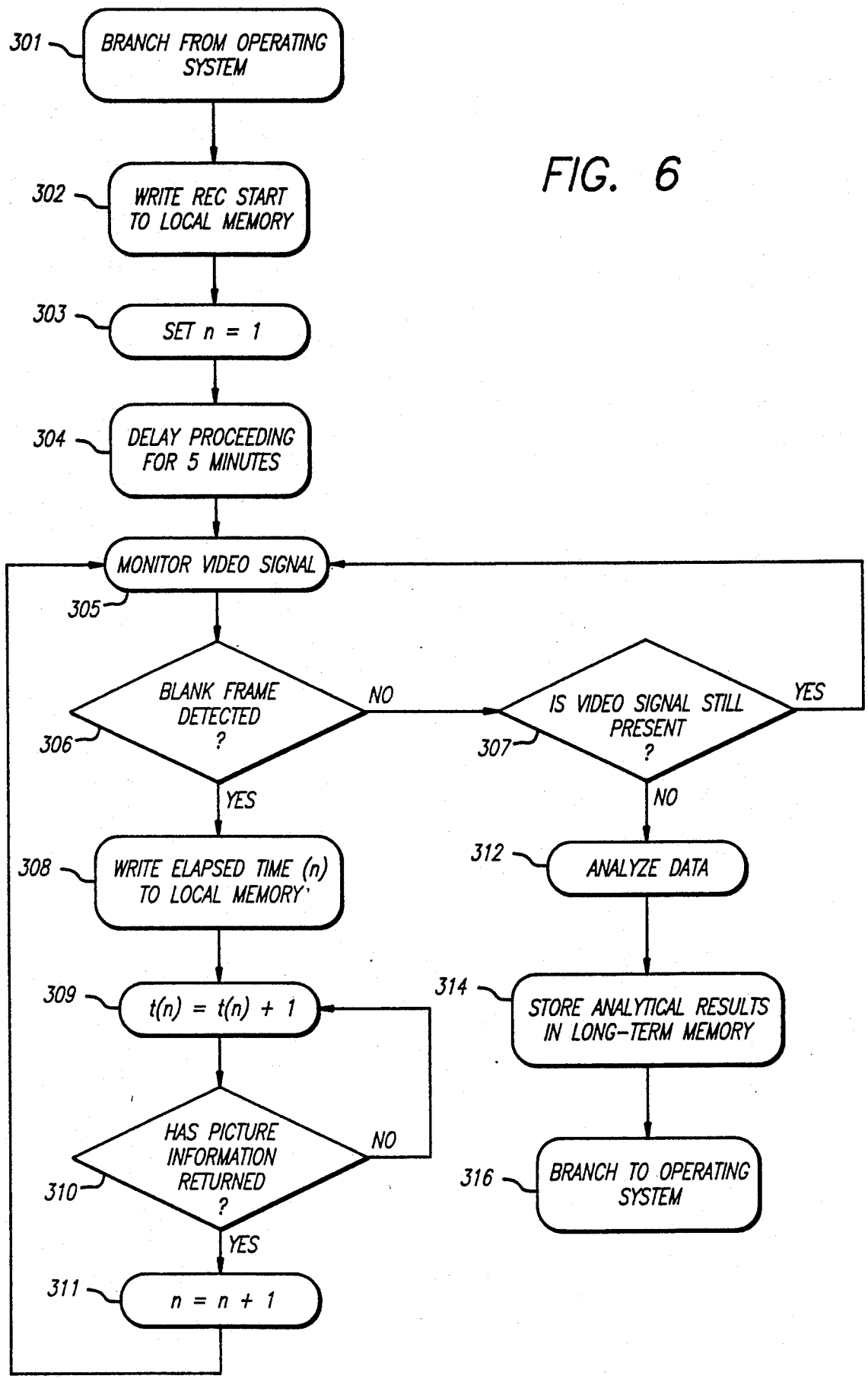
FIG. 6 is a functional flow diagram of the recording routine of the present invention.

Referring next to FIG. 6, the record mode of operation is shown. The operating system branches to entry point 301, after which the time reference data to be associated with commencement of recording is stored at step 302. At step 303, index n is initialized to "1" and the program then enters a timed waiting loop at step 304. The purpose of this waiting loop is to insure that a television program having a "teaser" and/or a credit sequence at the beginning thereof will not have these portions classified as commercials. The wait interval is preferably approximately five minutes, although any other value could be implemented.

Following the wait interval, input 107 from decoder 106 is polled to determine if a blank frame has been detected. If a blank frame has not been detected, but examination of the sync input at step 307 reveals that the video signal is still present, the program returns to step 306. If a blank frame is detected, the current time value is stored in memory at step 308 and an interval time is incremented at step 309. The output of decoder 106 is monitored at step 310 to determine if picture information has returned. As long as the video signal remains blank, the program cycles through step 309 incrementing the interval time. Once picture information returns, the program branches to step 311 where index n is incremented and the program returns to step 306 to await the next blank frame. A matrix of information is thus developed providing the time and duration of each blank interval in the video signal.

When it is determined at step 307 that the video signal is no longer present, indicating that the VCR has turned off, the program branches to step 312 where the accumulated matrix of information is analyzed in accordance with the commercial recognition algorithms described below in connection with FIG. 8. A map of the entire video signal is thus created indicating which portions contain commercials and which portions do not. The map is saved in RAM 124 at step 314 and the program returns to the operating system at step 316.

Figure 7A:
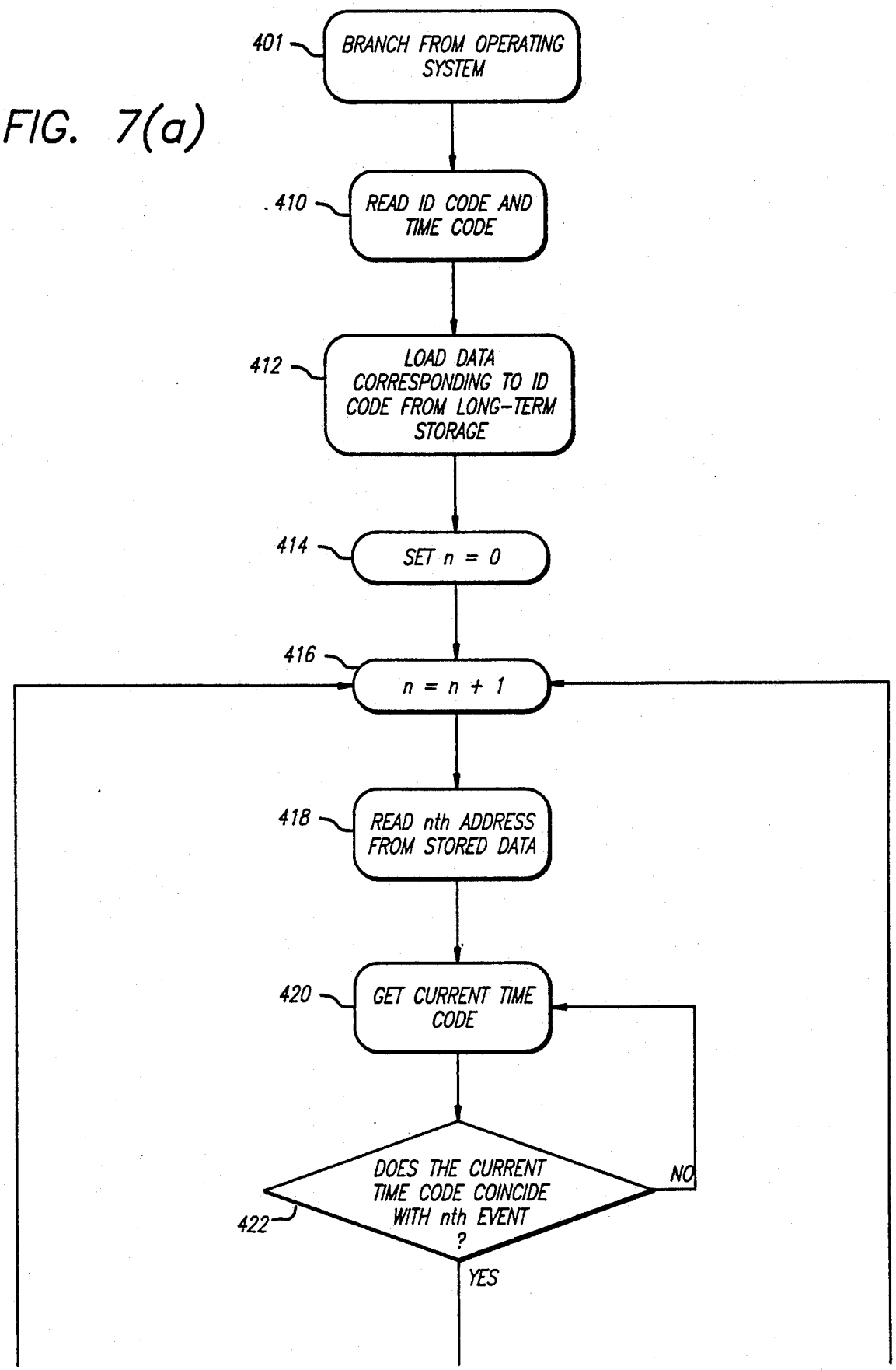
FIGS. 7a and 7b are a functional flow diagram of the playback routine of the present invention.
Figure 7B:
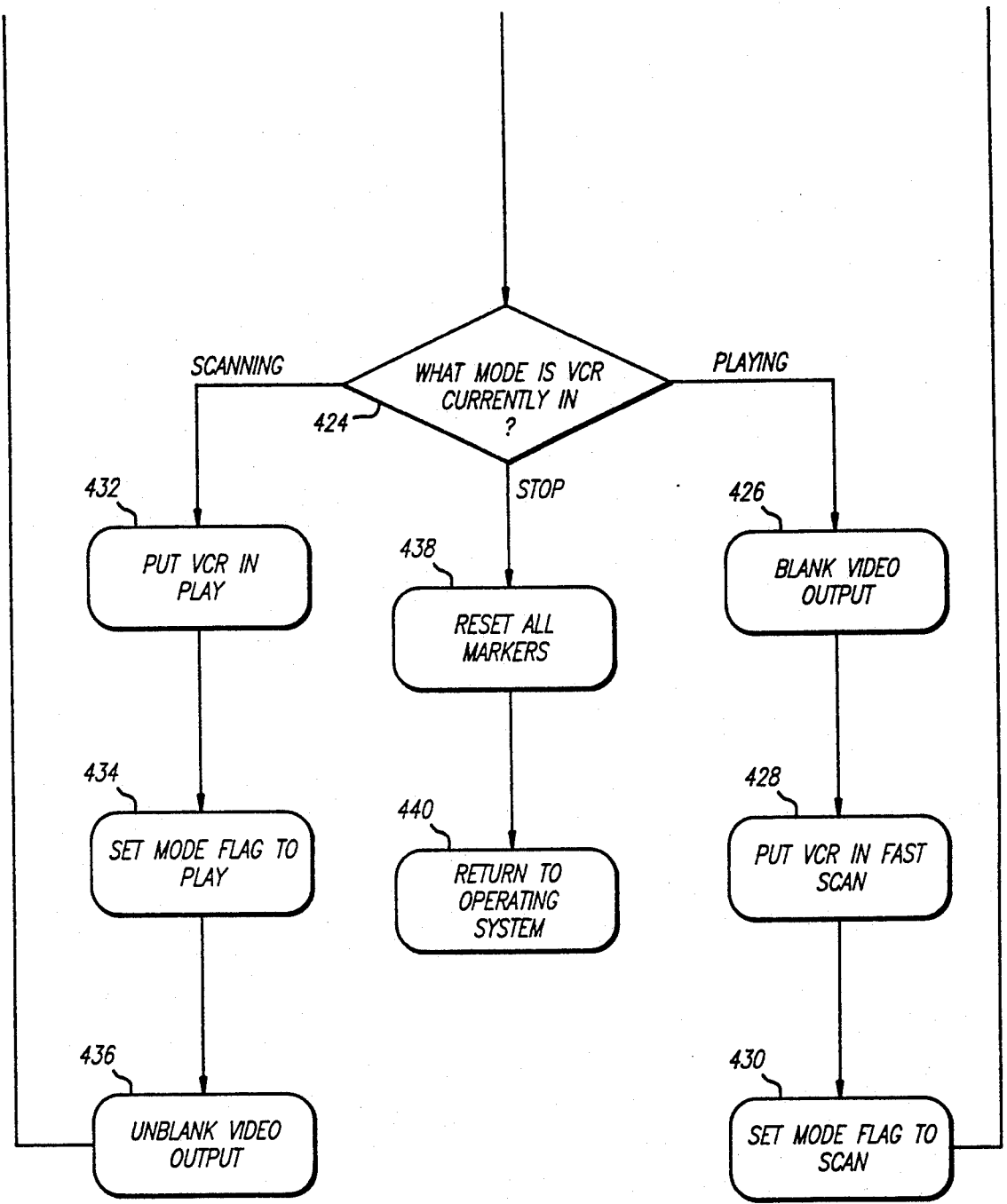

FIG. 7 illustrates the playback routine of the system. This routine is entered at step 401 from the operating system. Output 111 of decoder 110 is polled at step 410 to determine the identification code of the video tape being played. At step 412, the video signal map corresponding to the video tape being played is retrieved from RAM 124. Index n is initialized to "0" at step 414 and incremented by "1" at step 416. The indexed information from the retrieved map is read at step 418, following which output 109 of decoder 108 is polled at step 420 to obtain the next time code from the video tape. The time code is more properly regarded as a tape position code since the relationship between real time during playback and tape position will depend on the speed at which the tape is played, including periods during which the VCR is operated in the fast scan mode. However, since the tape is recorded at a constant speed, which is identical to the replay speed in the normal "play" mode, the time code precisely correlates with real time during the recording process. Accordingly, once the time code interval is calibrated during normal "play", the time code will provide an accurate measure of time relative to the recorded video signal for comparison with the stored event times.

At step 422, the current time code information is compared to the current index entry to determine if there is indexed information relating to the current position of the tape. If not, the program returns to step 420 to await the next time code. When there is a correlation between the video tape time code and event time of the current index, the current mode of the VCR is examined at step 424. If the VCR is in the normal "play" mode, the microcontroller causes video switch 140 to select the output of video generator 138, thereby blanking the screen of the television. The VCR is then commanded to the fast scan mode and the VCR mode flag is set to "scan" at step 430. The program then returns to step 416 where the index is incremented to await the next correlation between the indexed event time and the video tape time code.

If the VCR is determined to be in the fast scan mode at step 424, the VCR is returned to the play mode at step 432 and the mode flag is set to "play" at step 434. Video switch 140 is then controlled to select the video signal received from the VCR at step 436. The program again returns to step 416. If the VCR is determined to be stopped at step 424, all markers are reset in step 438 and the program returns to the operating system from branch point 440.

Figure 5A:
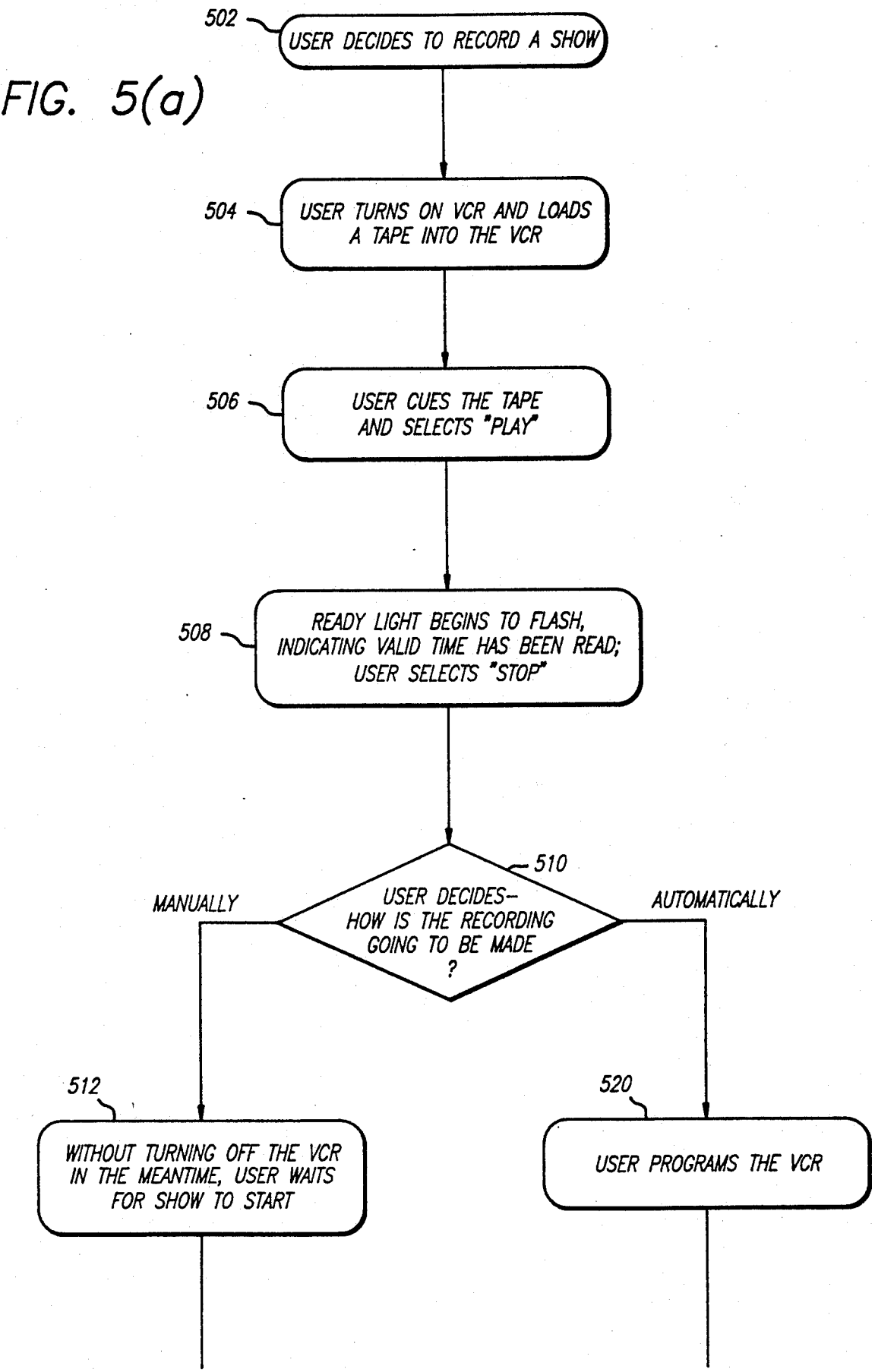
FIGS. 5a and 5b are a functional flow diagram of a set up procedure for recording a television signal with the system of the present invention.
Figure 5B:
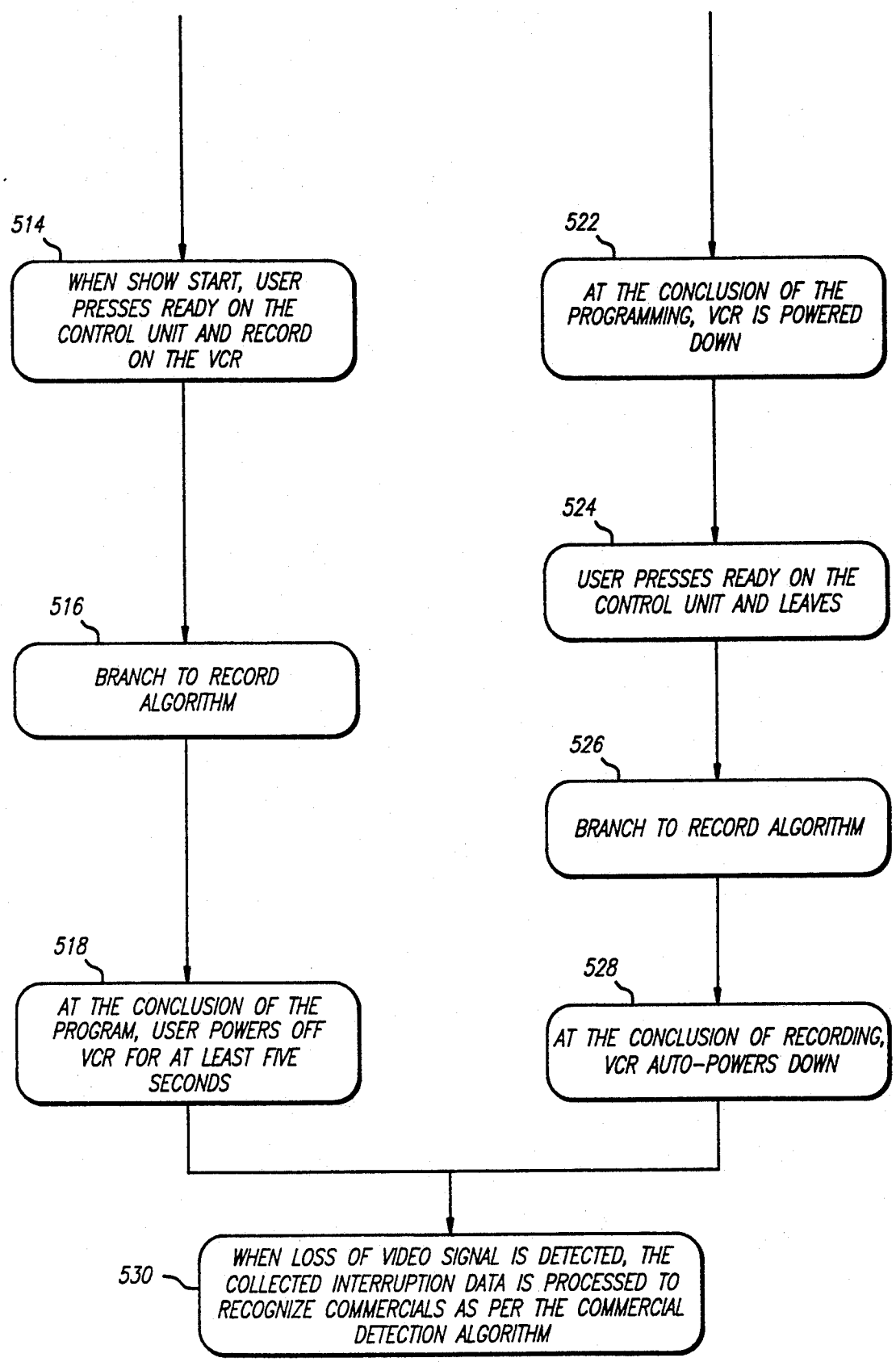

Referring now to FIG. 5, the set up procedure for recording a television signal is illustrated. This procedure is an interactive process involving both manual actions by the operator and actions automatically performed by control unit 12. Beginning at step 502, the operator decides to record a television program. The operator then turns on the VCR at step 504 and loads a specially prepared video cassette as described above. In step 506, the operator positions the video tape to the approximate desired starting point for the program to be recorded and then places the VCR in the "play" mode. When the control unit receives a valid tape identification code and a valid time code from the video tape, "ready" light 32 on the control unit begins to flash at step 508. The operator then stops the VCR (a step which may be automated by sending the appropriate "stop" command to the VCR with IR emitter 22) and the operator decides at step 510 to either manually begin recording or to program the VCR to begin recording at a later time.

If manual recording is performed, the procedure branches to steps 512 and 514 where the operator places the VCR in the "record" mode at the appropriate time and also presses "ready" button 30 on control unit 12. This causes the operating system in the control unit to branch to the record routine as described above.

If the VCR is programmed to record at a later time, the operator performs the appropriate programming procedure in step 520 and then turns off the VCR at step 522. The operator then presses the "ready" button on control unit 12 in step 524 which arms the system to branch to the record routine as soon as the presence of video signals from the VCR is detected.

Whether recording is done manually or by program, the VCR is turned off when recording is completed (steps 518 and 528), thereby causing the record routine to branch to the data analysis/commercial recognition routine at step 530.

Figure 8A:
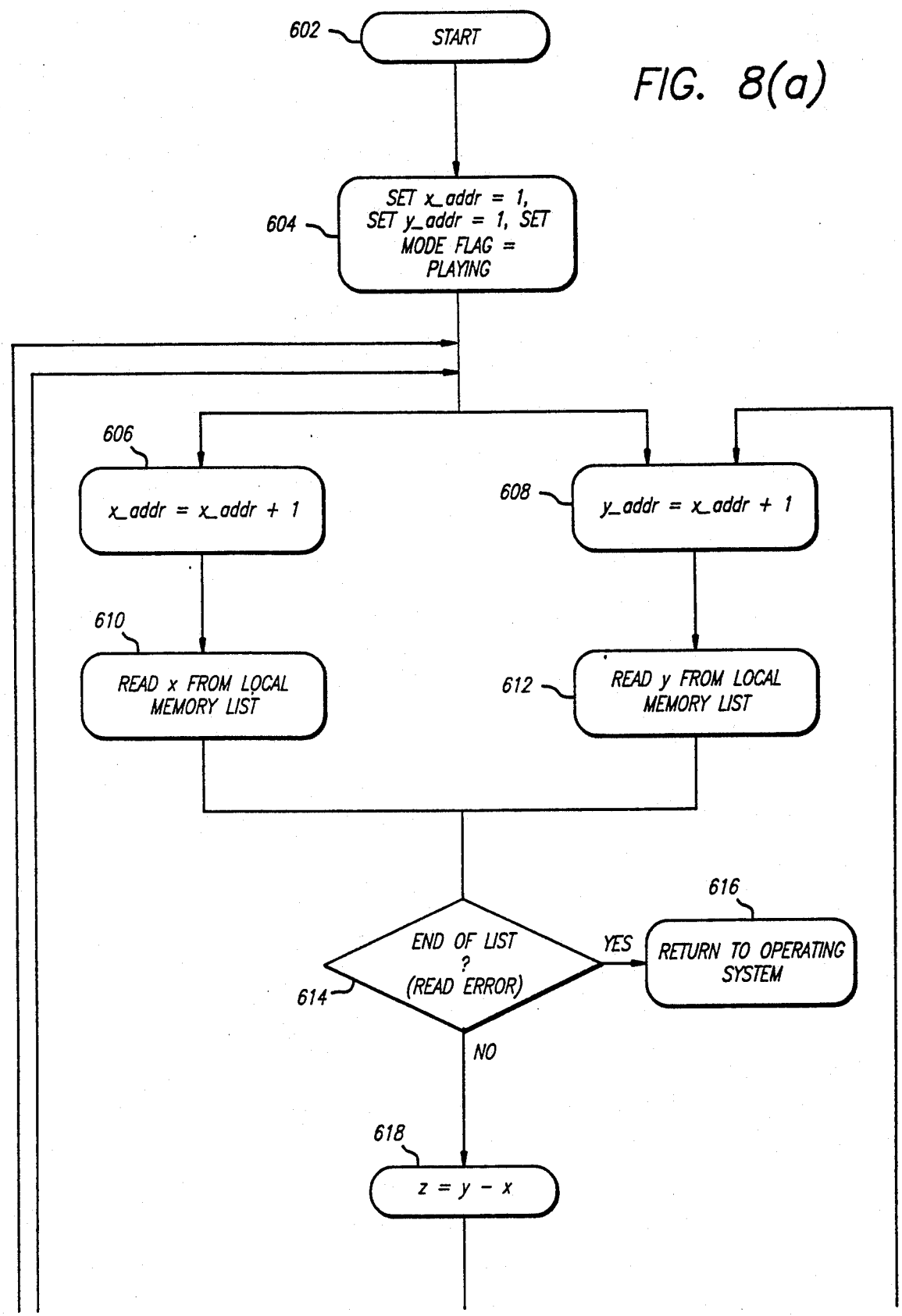
FIGS. 8a and 8b are a functional flow diagram of the commercial recognition algorithm of the present invention.
Figure 8B:
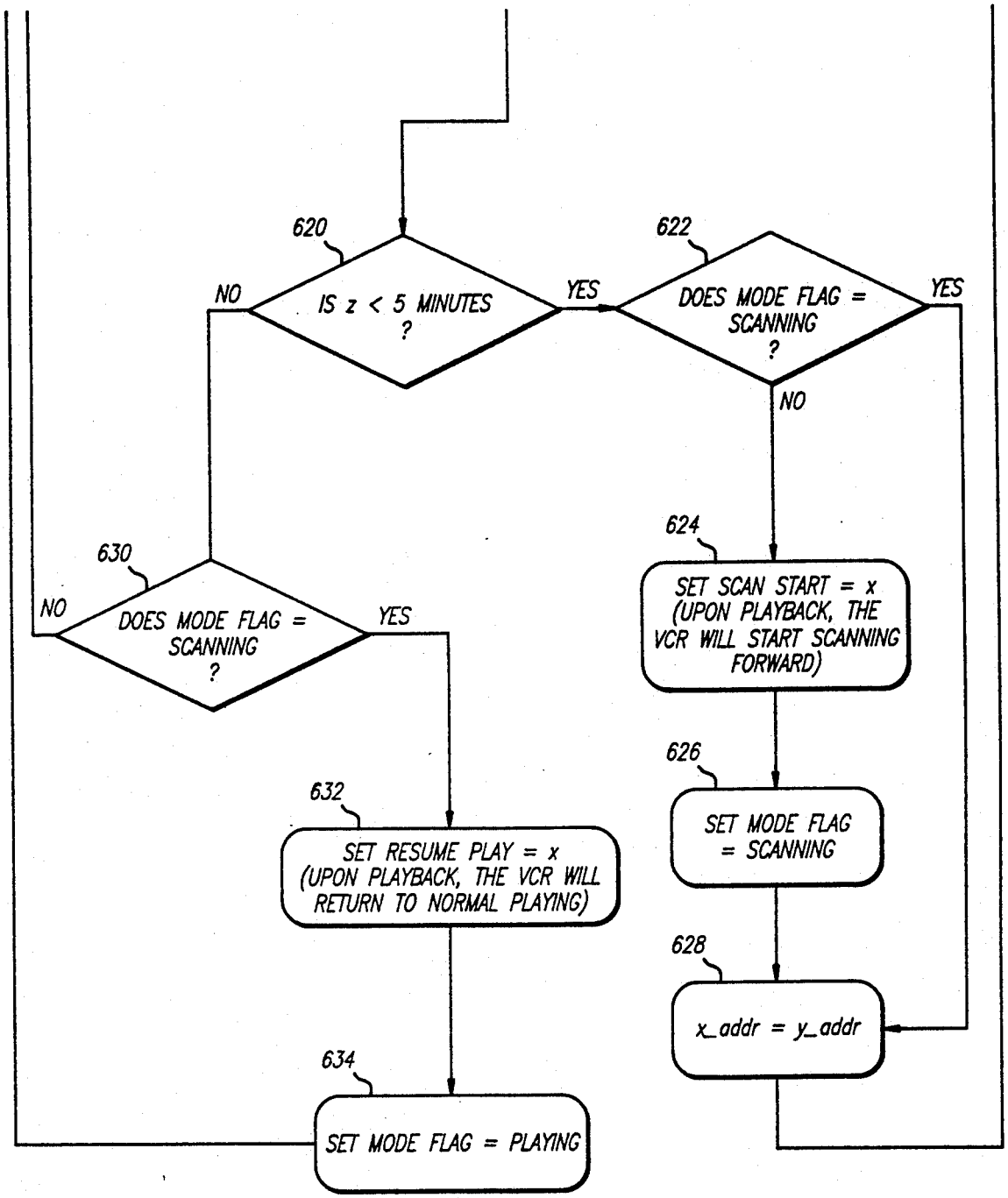

One approach for recognizing commercials in the video signal based on data stored during the record routine is illustrated in FIG. 8. This routine represents an expanded description of steps 312 and 314 of FIG. 6. The routine is entered from the record routine as step 602. Memory pointers are initialized at step 604. A VCR mode flag is set to "playing" so that the first portion of the recorded video signal will always be played. Two memory pointers are utilized, an x_addr pointer and a y_addr pointer which is always maintained at a value of one greater than the x_addr pointer. Thus, these pointers will always access adjacent pairs of indexed events.

The memory pointers are incremented at steps 606 and 608 and corresponding data for the time of occurrence of the events (e.g., a series of blank frames) is retrieved from memory at steps 610 and 612. If the end of the indexed list of events is reached, the commercial recognition routine ends at step 616 and the program returns to the operating system.

If it is determined at step 614 that the end of the list has not yet been reached, the time interval between the events is computed at step 618. This computed time interval is tested at step 620 to determine if it is less than five minutes. It has been observed that scene fades within a television program seldom occur more frequently that once every five minutes, whereas commercial and promotional messages are almost always shorter than five minutes. This particular value; however, is not a limiting aspect of the invention.

If two sets of blank frames are separated by an interval of less than five minutes, it is presumed that the video signal between these events is a commercial. The program to step 622 where the VCR mode flag is tested. If the VCR is already in the "scanning" mode, the x_addr index is incremented at step 628 and the program returns to step 608. If the VCR mode flag is not set to "scanning", i.e., it is set to "playing", then the x_addr index data (representing the beginning of the detected commercial) is assigned a "scan start" flag at step 624 and the VCR mode flag is set to "scanning" at step 626.

If the inter-event interval is determined at step 620 to be greater than or equal to five minutes, the video signal is presumed to contain program material that should be played in normal fashion. The VCR mode flag is tested at step 630 and if the flag is already set to "playing", the program returns to steps 606 and 608. If the VCR mode flag is set to "scanning", the data for the x_addr index is assigned a "resume play" flag at step 632 and the VCR mode flag is set to "playing" at step 634.

Data for each pair of indexed events is tested in like fashion so that each inter-event interval is assigned either a "scan start" flag or a "resume play" flag to control operation of the VCR during playback.

Additional parameters of the video signal may be tested to enhance the success rate of properly identifying commercials. For example, the inter-event interval may be tested to determine if it is a multiple of five seconds since commercial messages are almost always aired in such multiples. Furthermore, patterns of events characteristic of typical commercial interruptions may be stored for comparison with the recorded pattern of events.

Time Code Videotape

Figure 9:
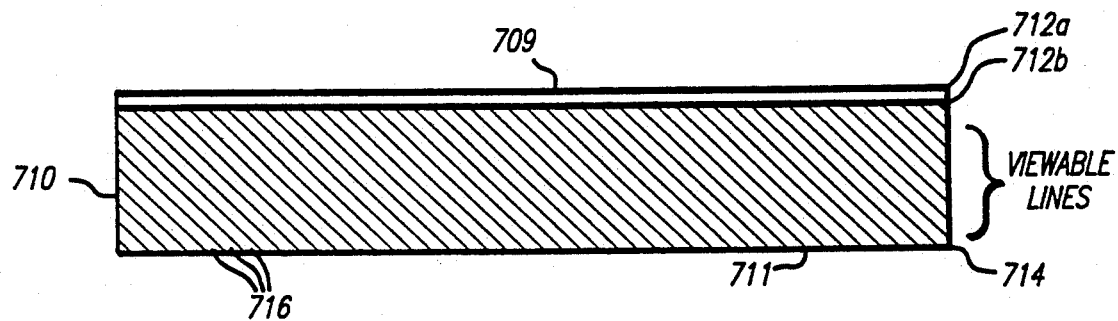
FIG. 9 illustrates the manner in which signals are recorded on a conventional videotape.

A specially prepared videotape suitable for use with the above-disclosed system will now be described. FIG. 9 illustrates the manner in which signals are recorded on a conventional videotape for home use. The videotape 710 comprises a plastic substrate, typically a polyester film, coated with a magnetic material, such as iron oxide or chromium dioxide. Three different signals are recorded on the tape. Audio information (either monaural or stereo) is recorded on one or both of audio tracks 712a and 712b adjacent to edge 709 of the tape. A control track 714 is recorded adjacent to opposite edge 711 of the tape. Control track 714 records a standardized analog signal for use in synchronizing playback of the videotape.

The majority of the surface of videotape 710 is devoted to recording the video signal in a series of substantially transverse tracks 716 that are produced as the record head scans a helical path across the moving tape. In the popular video home system (VHS) format, each video track 716 contains one field of video information (½ frame or 1/60th second) It will be recognized that the viewable video image, which typically comprises approximately 480 lines of a standard 525 line television raster, is contained in the center portion of videotape 710, whereas those portions of tracks 716 adjacent to tracks 712b and 714 contain the video signals for raster lines that are generally outside of the viewable image.

Figure 10:
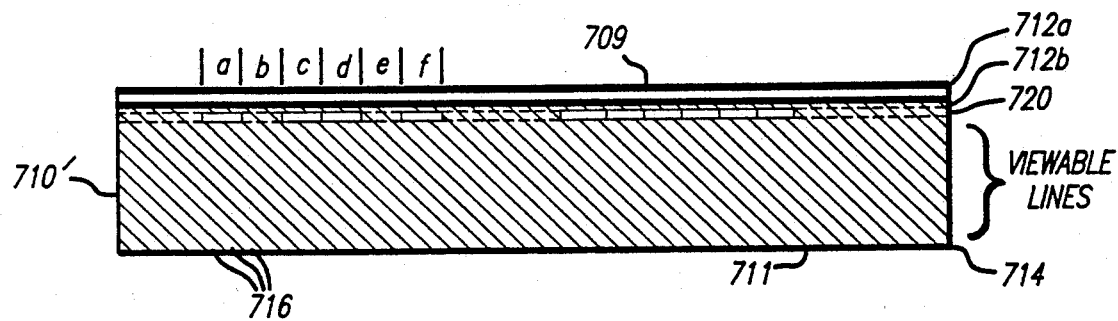
FIG. 10 illustrates the manner in which a videotape is encoded with permanent timing indicia in accordance with the present invention.

Referring now to FIG. 10, a preferred method for permanently encoding videotape 710 with timing information is illustrated. The videotape is treated to selectively remove the magnetic coating within a narrow longitudinal stripe adjacent to audio tracks 712. Alternatively, stripe 720 could be located adjacent to control track 714, the objective being to remove the magnetic coating within the region scanned by the read heads of a VCR, but outside of the region of tape 710 on which the viewable video image is recorded and also outside of the region where the vertical blanking interval is recorded containing non-viewable information, such as closed captioning signals. Instead of removing the magnetic coating, it may be selectively depolarized or otherwise treated within stripe 720 so that there is a detectable change in the recorded signal at those locations where the coating has been treated.

The magnetic coating is selectively removed within stripe 720 at predetermined "bit" intervals. For example, as shown in FIG. 10, the magnetic coating is removed in intervals a, c, d and f, but is not removed in intervals b and e. This may be interpreted as the binary sequence 101101. As will be appreciated by those skilled in the art, more sophisticated data encoding techniques to provide error checking and correction may be employed.

As the videotape is played, the video signal in the region outside of the viewable image will experience periodic drop outs as the playback head scans across areas where the magnetic coating has been removed. These drop outs are easily detected, and the timing sequence of the drop outs is analyzed to recover the digital information encoded onto the tape. In this regard, each bit interval preferably spans a predetermined number of video frames so that the video sync pulses may be used to clock a bit counter.

In one embodiment of the invention, each sequence of coded bits comprises a tape identification code which remains constant throughout the length of the tape and a timing code which is incremented in each bit sequence. The tape identification code is useful in conjunction with long term storage of editing information for a plurality of tapes in a home viewer's library. Any number of bits may be used for the tape identification code, 8 bits providing 256 unique codes, 10 bits providing 1024 unique codes, etc.

The timing code may be marked at any convenient interval. If the time code is marked at nominal one second intervals, 16 bits of information will accommodate any currently contemplated combination of tape length and recording speed. It is important to recognize that the timing code serves primarily as an identifier of tape position rather than time, and thus the codes will provide valid information regardless of the speed at which the tape is recorded and played.

Figure 11:
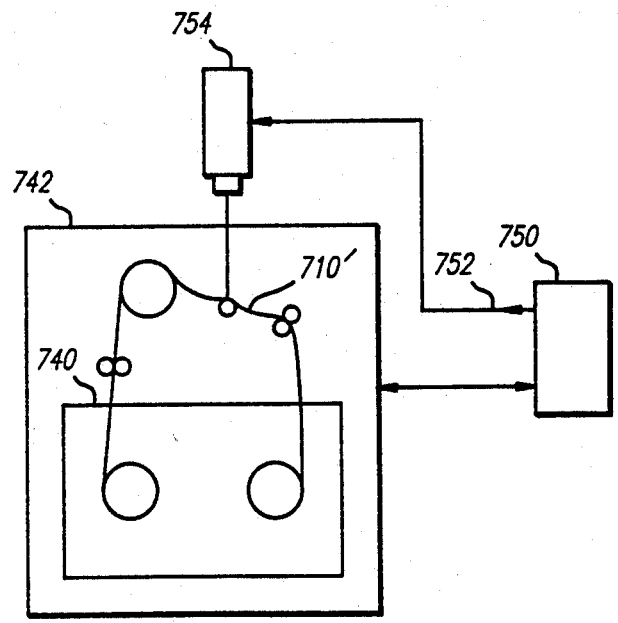
FIG. 11 illustrates a system for making the videotape as shown in FIG. 10.

FIG. 11 illustrates a method by which a standard videotape cassette may be processed to encode it in accordance with the present invention. The tape is passed at a controlled high speed by transport mechanism 742 past a laser 754. After a suitable delay to allow sufficient tape leader to pass, processor 750 begins to generate a coded output signal to laser 754 which is focused on the videotape at the lateral position of stripe 720. As the videotape advances, the appropriate timing code is written onto the tape by laser 754 in the proper bit sequence. After each bit sequence is written, processor 750 increments the timing code and the sequence of events continues until the entire length of the videotape has been encoded. Of course, the videotape may be processed in bulk form prior to or concurrently with the cassette loading operation.

Although the invention has been described in terms of a preferred embodiment in which the magnetic coating of a videotape is selectively removed to encode it with timing information, other coding techniques may be employed as well. As mentioned above, the magnetic coating may be depolarized or otherwise treated instead of being removed. Furthermore, the videotape may be optically encoded, such as with a bar-code pattern applied to the back (uncoated) side of the tape. Of course, this technique would not allow recovery of the encoded information from the video signal on playback, but, as previously explained, this technique may be advantageously employed if the control unit and VCR are combined. In the case of a self-contained control unit, it would be necessary to provide an optical decoder, preferably within the video cassette itself. The timing information from the optical decoder could be conveniently transmitted to an editing control unit by a microtransmitter also housed within the video cassette. Alternatively, the video cassette and the editing control unit may be coupled by an umbilical cable. In this regard, home VCRs are now almost universally front loading machines so that an umbilical cable can easily pass through the loading door even while the video cassette is being played.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

We claim:

1. A method of automatically editing a videotape comprising the steps of:
   (a) recording a video signal on a videotape;
   (b) monitoring the video signal as it is recorded to detect event markers therein;
   (c) storing data representative of a time of occurrence of each event marker;
   (d) analyzing the data to classify the video signal between event markers as one of a first and second type;
   (e) storing a time-based map of the video signal containing a plurality of entries, each of said plurality of entries comprising an event time and classification information for the video signal associated with said event time;

(f) playing the videotape to reproduce the video signal recorded thereon;

(g) retrieving the stored time-based map of the video signal;

(h) determining a time value for the videotape being played;

(i) comparing the time value for the videotape being played with the event time of a next entry in the time-based map to detect coincidence therebetween;

(j) playing the videotape following said coincidence at a fast rate if the classification information of said next entry in the time-based map corresponds to the second type; and (k) repeating steps (g)–(j) for each entry in the time-based map.

2. The method of claim 1 wherein the event markers comprise blank frames.

3. The method of claim 2 wherein the step of analyzing data comprises analyzing the spacing and duration of event markers.

4. The method of claim 1 wherein the step of analyzing data is performed subsequent to recording an entire video program on the videotape.

5. The method of claim 1 further comprising the step of decoding tape identification indicia on the videotape to obtain tape identification data.

6. The method of claim 1 wherein the first type of video signal contains program material and the second type of video signal contains commercial material.

7. An automated videotape playback system comprising:

(a) a videotape player having a play mode and a fast scan mode and further having mode control means for selecting one of the play and fast scan modes as a function of a mode selection signal;

(b) a videotape for play on the videotape player;

(c) a data memory for storing data representative of a time of occurrence of a plurality of event markers in a video signal recorded on the videotape;

(d) a control unit coupled to the data memory and the videotape player for receiving the video signal played from the videotape, said control unit including:

(i) means for analyzing the data stored in the data memory to classify the video signal between event markers as one of a first and second type;

(ii) means for storing a time-based map of the video signal containing a plurality of entries, each of said plurality of entries comprising an event time and classification information for the video signal associated with said event time;

(iii) means for determining a time value for the videotape being played;

(iv) means for comparing the time value for the videotape being played with the time of occurrence of a next entry in the time-based map to detect coincidence therebetween;

(v) means for transmitting the mode selection signal upon detection of said coincidence to select the fast scan mode if the classification information of said next entry in the time-based map corresponds to the second type.

8. A method of recording a video program comprising the steps of:

(a) recording a video signal containing the video program on a recording medium;

(b) monitoring the video signal as it is recorded to detect events therein;

(c) storing data representative of a time of occurrence of each detected event;

(d) analyzing the data, after the video program has been recorded, to classify intervals of the video signal as being one of a first type for normal playback and a second type to be scanned past during playback; and (e) storing a time-based map identifying intervals of the video signal to be scanned past during playback.

9. A method of automatically scanning past portions of a recorded video program comprising the steps of:

(a) recording a video signal containing the video program on a recording medium;

(b) monitoring the video signal as it is recorded to detect events therein;

(c) storing data representative of a time of occurrence of each detected event;

(d) analyzing the data, after the video program has been recorded, to classify intervals of the video signal as being one of a first type for normal playback and a second type to be scanned past during playback;

(e) storing a time-based map identifying intervals of the video signal to be scanned past during playback;

(f) playing the recording medium to reproduce the video signal recorded thereon;

(g) retrieving the stored time-based map;

(h) determining a current time value for a portion of the video signal being played;

(i) identifying a portion of the video signal being played as corresponding to a next interval of the video signal to be scanned past during playback;

(j) rapidly advancing playback of the recording medium through said next interval of the video signal to be scanned past.

* * * * *

REEXAMINATION CERTIFICATE (2875th)

United States Patent [19]

Iggulden et al.

[11] B1 5,333,091

[45] Certificate Issued May 7, 1996

[54] METHOD AND APPARATUS FOR CONTROLLING A VIDEOTAPE PLAYER TO AUTOMATICALLY SCAN PAST RECORDED COMMERCIAL MESSAGES

[75] Inventors: Jerry Iggulden, Santa Clarita; Alan McFarland, North Hollywood, both of Calif.

[73] Assignee: Arthur D. Little Enterprises, Cambridge, Mass.

Reexamination Request:
No. 90/004,018, Nov. 6, 1995

Reexamination Certificate for:
Patent No.: 5,333,091
Issued: Jul. 26, 1994
Appl. No.: 2,782
Filed: Jan. 8, 1993

[51] Int. Cl.$^6$ .............. G11B 27/02; H04N 9/79
[52] U.S. Cl. .......... 360/14.1; 360/14.3; 358/311; 358/313; 358/908
[58] Field of Search ............ 360/13, 14.1, 14.2, 360/14.3, 33.1, 69, 71, 74.5; 358/908, 311, 312, 313, 335; 369/83

[56] References Cited

U.S. PATENT DOCUMENTS

| | | | |
|---|---|---|---|
| 2,424,216 | 7/1947 | Atkins | 179/1 |
| 2,630,525 | 3/1953 | Tomberlin et al. | 250/6 |
| 2,761,897 | 9/1956 | Jones | 179/1 |
| 3,011,030 | 11/1961 | Langendorf | 179/100.1 |
| 3,424,865 | 1/1969 | Marchand | 178/5.8 |
| 3,628,153 | 12/1971 | Fukata | 358/908 X |
| 3,681,523 | 8/1972 | Sidline | 360/72.3 |
| 3,725,604 | 4/1973 | Alexander | 358/908 X |
| 3,730,986 | 5/1973 | Morchand | 348/473 |
| 3,745,240 | 7/1973 | Morchand et al. | 348/473 |
| 4,229,765 | 10/1980 | Sanger | 348/734 |
| 4,259,689 | 3/1981 | Bonner et al. | 358/908 X |
| 4,314,285 | 2/1982 | Bonner et al. | 360/33.1 |
| 4,319,286 | 3/1982 | Hanpachern | 360/33.1 |
| 4,325,088 | 4/1982 | Wright | 360/14.2 |
| 4,343,024 | 8/1982 | Kawai | 360/74.6 |
| 4,390,904 | 6/1983 | Johnston et al. | 358/335 |
| 4,430,676 | 2/1984 | Johnson | 360/13 |
| 4,492,993 | 1/1985 | Otis | 360/74.5 |
| 4,520,404 | 5/1985 | Von Kohorn | 358/335 |
| 4,587,572 | 5/1986 | Di Giulio | 360/14.3 |
| 4,602,297 | 7/1986 | Reese | 360/14.1 |
| 4,605,973 | 8/1986 | Von Kohorn | 358/335 |
| 4,618,895 | 10/1986 | Wright | 358/311 |
| 4,750,052 | 6/1988 | Poppy et al. | 358/335 |
| 4,750,053 | 6/1988 | Allen | 358/335 |
| 4,750,213 | 6/1988 | Novak | 455/67 |
| 4,752,834 | 6/1988 | Koombes | 358/335 |
| 4,774,600 | 9/1988 | Baumeister | 360/14.3 X |
| 4,782,401 | 11/1988 | Faerber et al. | 358/335 |
| 4,879,611 | 11/1989 | Fukui et al. | 360/69 |
| 4,918,531 | 4/1990 | Johnson | 358/908 X |
| 4,979,047 | 12/1990 | Wine | 358/335 |
| 5,019,899 | 5/1991 | Boles et al. | 348/184 X |
| 5,057,932 | 10/1991 | Lang | 358/335 |
| 5,075,546 | 12/1991 | Kamada et al. | 250/231.1 |
| 5,151,788 | 9/1992 | Blum | 358/908 X |

FOREIGN PATENT DOCUMENTS

| | | |
|---|---|---|
| 0158293 | 10/1985 | European Pat. Off. . |
| 0161512 | 11/1985 | European Pat. Off. . |
| 0146072 | 8/1983 | Japan . |
| 0292655 | 12/1991 | Japan . |
| 8100945 | 4/1981 | WIPO . |

*Primary Examiner*—Andrew L. Sniczek

[57] ABSTRACT

An automatic editing device is coupled between a conventional VCR and a conventional television monitor/receiver. During recording of a television signal, data is accumulated with respect to the time of occurrence and duration of detectable events, such as blank frames, in the television signal, and such data is stored in the device. At a time subsequent to the recording process, the stored data is analyzed to classify the content of the television signal between the detectable events. The recording is made on a tape which has timing reference data permanently encoded thereon. During playback, the stored data for each event is compared to the timing reference data read from the tape and the VCR is automatically commanded into a fast scan mode when the tape reaches the beginning time of a portion of the video signal that has been classified for elimination during playback. The VCR is then automatically commanded to return to the normal "play" mode when the tape reaches the ending time of that portion of the video signal. Since all of the television signal is recorded on the tape, any or all of the signal may be viewed, even if portions of it have been misclassified.

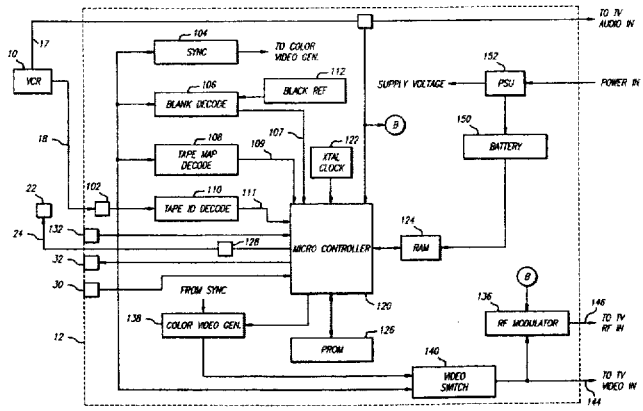

B1 5,333,091

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-9 is confirmed.

* * * * *

REEXAMINATION CERTIFICATE (3080th)

United States Patent [19]
Iggulden et al.

[11] B2 5,333,091
[45] Certificate Issued Dec. 17, 1996

[54] METHOD AND APPARATUS FOR CONTROLLING A VIDEOTAPE PLAYER TO AUTOMATICALLY SCAN PAST RECORDED COMMERCIAL MESSAGES

[75] Inventors: Jerry Iggulden, Santa Clarita; Alan McFarland, North Hollywood, both of Calif.

[73] Assignee: Arthur D. Little Enterprises, Cambridge, Mass.

Reexamination Request:
No. 90/004,173, Mar. 7, 1996

Reexamination Certificate for:
Patent No.: 5,333,091
Issued: Jul. 26, 1994
Appl. No.: 2,782
Filed: Jan. 8, 1993

Reexamination Certificate B1 5,333,091 issued May 7, 1996

[51] Int. Cl.$^6$ .............. G11B 27/02; H04N 9/79
[52] U.S. Cl. .............. 360/14.1; 360/14.3; 358/311; 358/313; 358/908
[58] Field of Search .............. 360/13, 14.1, 14.2, 360/14.3, 33.1, 69, 71, 74.5; 358/908, 311, 312, 313, 335; 369/83

[56] References Cited

U.S. PATENT DOCUMENTS

| | | | |
|---|---|---|---|
| 4,570,192 | 2/1986 | Hori | 360/14.2 |
| 4,774,600 | 10/1988 | Baumeister | 560/14.1 |
| 5,063,456 | 11/1991 | Horiuchi et al. | 358/310 |

FOREIGN PATENT DOCUMENTS

| | | |
|---|---|---|
| 0378393 | 1/1990 | European Pat. Off. |
| 0505683 | 1/1992 | European Pat. Off. |
| 0526739 | 7/1992 | European Pat. Off. |
| 3135806 | 9/1981 | Germany |
| 3217557 | 5/1982 | Germany |
| 57-088542 | 2/1982 | Japan |
| 1-174192 | 7/1989 | Japan |
| 4-255949 | 10/1992 | Japan |
| 4-283447 | 10/1992 | Japan |
| 2246233 | 7/1990 | United Kingdom |

*Primary Examiner*—Andrew L. Sniezek

[57] ABSTRACT

An automatic editing device is coupled between a conventional VCR and a conventional television monitor/receiver. During recording of a television signal, data is accumulated with respect to the time of occurrence and duration of detectable events, such as blank frames, in the television signal, and such data is stored in the device. At a time subsequent to the recording process, the stored data is analyzed to classify the content of the television signal between the detectable events. The recording is made on a tape which has timing reference data permanently encoded thereon. During playback, the stored data for each event is compared to the timing reference data read from the tape and the VCR is automatically commanded into a fast scan mode when the tape reaches the beginning time of a portion of the video signal that has been classified for elimination during playback. The VCR is then automatically commanded to return to the normal "play" mode when the tape reaches the ending time of that portion of the video signal. Since all of the television signal is recorded on the tape, any or all of the signal may be viewed, even if portions of it have been misclassified.

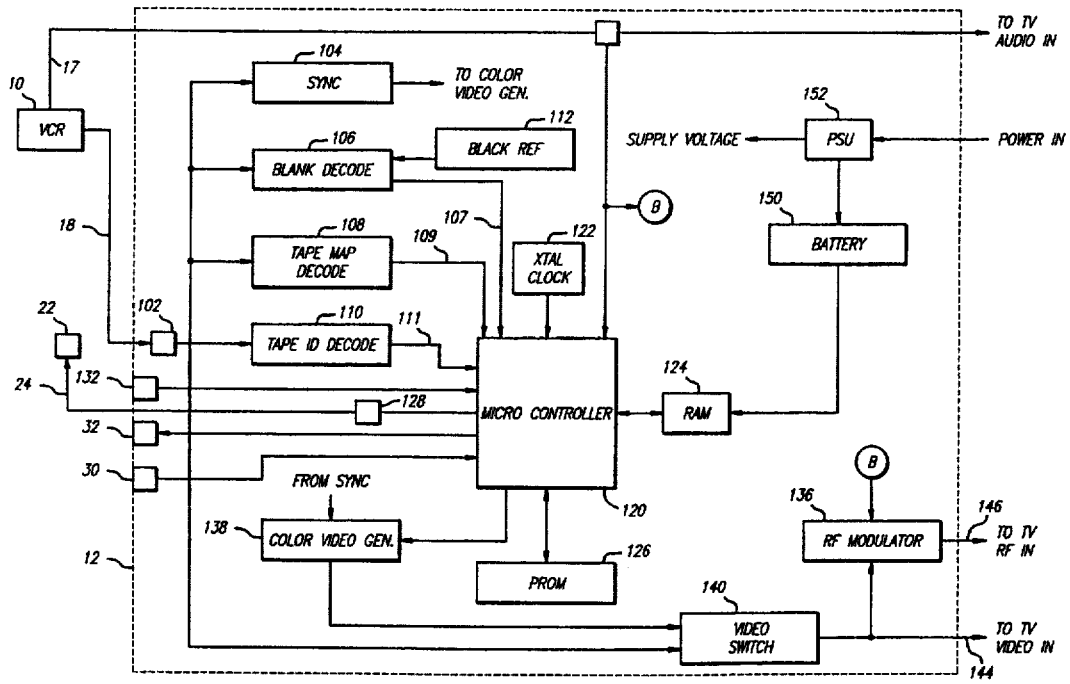

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–9 is confirmed.

* * * * *